United States Patent

[11] 3,627,788

[72] Inventors Jean Bouchaudon
Morsang-Sur-Orge;
Georges Jolles, Sceaux, both of France

[21] Appl. No. 779,632
[22] Filed Nov. 27, 1968
[45] Patented Dec. 14, 1971
[73] Assignee Rhone-Poulenc S. A.
Paris, France
[32] Priority Nov. 28, 1967
[33] France
[31] 130018

[54] NAPHTHACENE DERIVATIVES
7 Claims, No Drawings

[52] U.S. Cl. .................................................... 260/345.7,
424/283, 260/559 AT
[51] Int. Cl. .................................................... C07d 7/04,
C07d 7/18
[50] Field of Search .................................................... 260/345.7

*Primary Examiner*—Norma S. Milestone
*Attorney*—Stevens, Davis, Miller & Mosher ABSTRACT: Naphthacene derivatives of the formula:

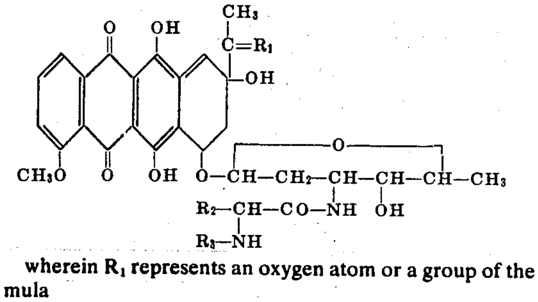

wherein $R_1$ represents an oxygen atom or a group of the formula

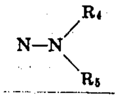

in which $R_4$ represents hydrogen or an alkyl, alkanoyl, thioalkanoyl, aryl, aroyl, carbamoyl, thiocarbamoyl or amidino group, these groups being optionally substituted, and $R_5$ represents hydrogen, or $R_4$ and $R_5$ together with the nitrogen atom to which they are attached represent piperazin-1-yl which carries on the second nitrogen atom an optionally substituted alkyl group, $R_2$ represents hydrogen, or an alkyl group, an aminoalkyl radical which is optionally substituted on the amino group, or an aryl, aralkyl, heterocyclyl or heterocyclylalkyl group and $R_3$ represents hydrogen, or $R_2$ and $R_3$ together represent an alkylene group containing three to six carbon atoms, and salts thereof, possess antitumor properties.

NAPHTHACENE DERIVATIVES

This invention relates to new therapeutically useful napthancene derivatives, to processes for their preparation and pharmaceutical compositions containing them.

According to the present invention, there are provided the new naphthacene derivatives of the general formula:

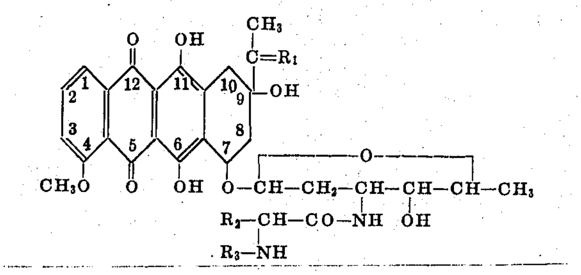

wherein $R_1$ represents an oxygen atom or a group of the formula

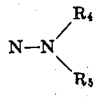

in which $R_4$ represents a hydrogen atom or an alkyl, alkanoyl, thioalkanoyl, aryl (e.g. phenyl), aroyl (e.g. benzoyl), carbamoy!, thiocarbamoyl or amidino group, these groups being optionally substituted, and $R_5$ represents a hydrogen atom, or $R_4$ and $R_5$ together with the nitrogen atom to which they are attached represent a piperazin-1-yl group which carries on the second nitrogen atom an optionally substituted alkyl group, $R_2$ represents a hydrogen atom or an alkyl group, an aminoalkyl radical which is optionally substituted on the amino group, or an aryl, aralkyl, heterocyclyl or heterocyclylalkyl group and $R_3$ represents a hydrogen atom, or $R_2$ and $R_3$ together represent a straight- or branched-chain alkylene group containing three to six carbon atoms, and salts thereof. The substituents which may be present on the groups $R_4$ and on the alkyl group in the 4-position of the piperazinyl ring when

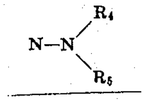

represents a 4alkyl-piperazin-1-yl group are preferably substituents of acid or basic character which are able to improve the solubility of the naphthacene derivatives of formula I in water. Preferably the substituents are quaternary ammonium and sulfonic acid groups, or residues of amino acids and of peptides. The alkyl, alkanoyl and thioalkanoyl groups or moieties mentioned above preferably contain at most four carbon atoms.

According to a feature of the present invention, the naphthacene derivatives of general formula I are prepared by the process which comprises reacting an amino acid of the general formula:

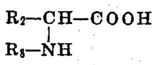

II (wherein $R_2$ and $R_3$ are as hereinbefore defined) with a naphthacene derivative of the general formula:

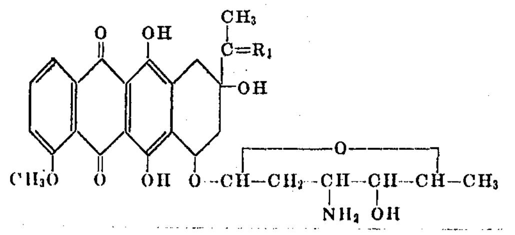

III (wherein $R_1$ is as hereinbefore defined) or an acid addition salt; thereof, by methods known per se in peptide chemistry for converting a primary amino group into a grouping

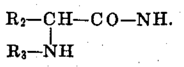

. By the term "methods known per se" as used in this specification is meant methods heretofore used or described in the chemical literature.

In the aforesaid process it is particularly advantageous to protect the amino group and to activate the carboxy group of the amino acid of general formula II. It is possible, for example, simultaneously to protect the amino group and activate the carboxy group by preparing an N-carboxyanhydride of the general formula:

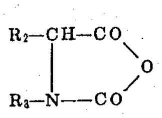

IV wherein $R_2$ and $R_3$ are as hereinbefore defined, by reaction of phosgene with the amino acid of general formula II.

Reaction of the naphthacene derivative of formula III with the N-carboxyanhydride of formula IV is generally effected in an aqueous or aqueous-organic medium buffered to a pH of between 8 and 11 and at a temperature of about 0° C.

It is also possible to protect the amino group(s) of the amino acid of general formula II and then to activate the acid group.

The protective group on the amino group(s) may optionally be removed subsequent to the reaction, by methods known per se which do not effect the rest of the molecule. Preferred protecting groups are trityl and t.-butoxycarbonyl, which may be removed by hydrolysis in a dilute acid medium. Where the amino acid of formula II has several amino groups, a selective elimination of the protective group on the amino group in the α-position to the carbonyl group can be achieved under certain conditions, this group being more labile than groups protecting the other amino groups.

The acid group of the amino acid of formula II may be activated by esterification with hydroxy-containing compounds such as N-hydroxysuccinimide, p-nitrophenol, 2,4,5-trichlorophenol or 4-hydroxypiperidine. Such activated esters may optionally be prepared in situ.

When the aforesaid process is carried out with an activated and protected amino acid and a naphthacene compound of formula III, it is preferably effected in an organic solvent, for example ethyl acetate or dimethylformamide, in the presence of a carbodiimide such as dicyclohexylcarbodiimide at a temperature between −15° and +25° C., optionally in the presence of an organic base such as triethylamine.

When an amino acid of general formula II, of which the amino group is optionally protected as mentioned above, is reacted with a naphthacene derivative of formula III, the reaction can be effected in an organic solvent, for example ethyl acetate, dimethylformamide, acetonitrile or methylene chloride, at a temperature between 0° and 30° C. in the presence of a carbodiimide such as dicyclohexylcarbodiimide.

The naphthacene starting material of formula III wherein $R_1$ represents an oxygen atom is the antibiotic designated number 13,057 R.P., which has been given the name "daunorubicin." Its preparation and physicochemical properties have been described in the specification of British Pat. No. 985,598 granted to Rhone-Poulenc S.A. on an application filed May 16th, 1963. It has since been established that the antibiotic has the formula III, $R_1$ representing oxygen.

The naphthacene starting materials of general formula III wherein $R_1$ represents a radical

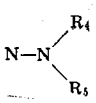

in which $R_4$ and $R_5$ are as hereinbefore defined, are obtained by the reaction of a compound of the general formula:

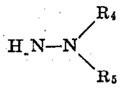

V with daunorubicin under the usual conditions for the conversion of ketones to hydrazono compounds.

In accordance with a further feature of the present invention, the naphthacene derivatives of general formula I wherein $R_1$ represents a radical

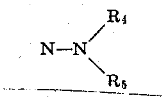

(wherein $R_4$ and $R_5$ are as hereinbefore defined) are prepared by the process which comprises reacting a compound of general formula V with a naphthacene derivative of general formula I wherein $R_1$ represents an oxygen atom. The reaction is carried out under the usual conditions for the conversion of ketones to hydrazono compounds, and is preferably effected in an inert organic solvent, such as an alcohol (e.g. ethanol) or dimethylformamide, with gentle heating of the reaction mixture.

The naphthacene derivatives prepared by the aforementioned processes may, where appropriate, be converted into acid addition salts or salts with nitrogen-containing bases, into metal salts or into quaternary ammonium salts. The salts may be obtained by the reaction of the naphthacene derivatives of formula I with acids or bases in appropriate solvents. As organic solvents there may be used, for example, alcohols, ethers, ketones, or chlorinated hydrocarbons. The salt which is formed is precipitated, if necessary after concentration of its solution, and is separated by filtration or decantation. The quaternary ammonium salts may be obtained by the reaction of esters on the naphthacene bases, optionally in an organic solvent, at room temperature or more rapidly with gentle heating.

The naphthacene derivatives of general formula I and their salts have interesting antitumor properties, combined with a low toxicity. They have proved particularly active against leukemia L 1210 (administered intraperitoneally) in mice. The experiments were carried out on 1 month old mice weighing 18 to 20 g. intraperitoneally grafted with $10^3$ leukemia L 1210 cells and treated daily with doses of the naphthacene derivatives between 0.5 and 5 mg./kg. (i.p.). Preferred compounds of formula I are those in which $R_1$ represents an oxygen atom or a thiocarbamoyl group, and $R_2$ represents an alkyl group containing up to four carbon atoms, an aminoalkyl group containing up to four carbon atoms in the alkyl moiety unsubstituted on the amino group or carrying thereon a trityl grouping, or a phenylalkyl group containing up to four carbon atoms in the alkyl moiety, and acid addition salts thereof. Of outstanding importance are 4-methoxy-5,12-dioxo-6,9,11-trihydroxy-7-(2,3,6-o-tridesoxy-3-N-L-leucylamino-1-L-lyxohexosyl)-9-acetyl-5,7,8,9,10,12-hexahydronaphthacene and the corresponding N-D-leucylamino, N-L-phenylalanylamino, N-ε-trityl-L-lysylamino and N-L-phenylglycylamino compounds, and 4-methoxy-5,12-dioxo-6,9,11-trihydroxy-7-(2,3,6-O-Tridesoxy-3-N-L-leucylamino-1-L-lyxohexosyl)-9-[1-(thiosemicarbazono)ethyl]-5,7,8,9,10,12-hexahydronaphthacene, and their acid addition salts.

For therapeutic purposes, the naphthacene derivatives of formula I may be employed as such or in the form of nontoxic salts, i.e. salts containing anions which are relatively innocuous to the animal organism in therapeutic doses of the salts, e.g. acid addition salts such as hydrochlorides, sulfates, nitrates, phosphates, acetates, propionates, succinates, benzoates, fumarates, maleates, tartrates, theophyllineacetates, salicylates, phenolphthalinates or methylene-bis-β-hydroxynaphthoates, metal salts such as the sodium salts, or salts with nitrogen-containing bases. They may also be employed in the form of nontoxic quaternary ammonium salts obtained by reaction of the napthacene derivatives with organic halides, e.g. methyl, ethyl, allyl or benzyl chloride, bromide or iodide, or other reactive esters, e.g. methyl- or ethylsulphates, benzenesulphonates or toluene-p-sulphonates.

The following examples illustrate the invention. The products of formula I in which $R_1$ represents an oxygen atom obtained by the procedures described are given a simplified form of nomenclature by replacing "4-methoxy-5,12-dioxo-6,9,11-trihydroxy-7-(2,3,6-O-tridesoxy-3-N-"substituent" amino-1-L-lyxohexosyl)-9-acetyl-5,7,8,9,10,12-hexahydronephthacene" by "N-"substituent"daunorubicin."

EXAMPLE 1

Daunorubicin hydrochloride (0.5 g.) is dissolved in a solution (100 cc.) buffered to pH 10 and having the following composition per liter:

| | |
|---|---|
| boric acid | 6.184 g. |
| potassium chloride | 7.456 g. |
| N aqueous sodium hydroxide | 88 cc. |
| distilled water | to make up to 1 liter. |

The pH of the daunorubicin solution thus obtained is adjusted to 10.2 by addition of N aqueous sodium hydroxide, and the solution is then cooled to 0° C. The solution is stirred very vigorously under a nitrogen atmosphere and L-leucine N-carboxyanhydride (0.001 mole) dissolved in acetone (5 cc.) cooled to −10° C. is added. The mixture is stirred vigorously for 5 minutes at 0° C. and under a nitrogen atmosphere. The pH is thereafter adjusted to about 3.5 by means of normal sulphuric acid and the mixture stirred for 15 minutes and then treated with alkali to give pH 7, using normal aqueous sodium hydroxide.

Lyophilization of the solution thus obtained yields a red powder which is dissolved in a mixture of methanol and 1,2-dichloroethane (1:1 by volume; 20 cc.). The solution is filtered through silica gel (45 g.) contained in a column 20 mm. in diameter. The filtrate is evaporated to dryness under reduced pressure (20 mm. Hg) at 50° C., taken up in water and then lyophilized.

The resulting powder is dissolved in a mixture of methanol and 1,2-dichloroethane (6:4 by volume; 3 cc.), and the solution is chromatographed through a column 17 mm. in diameter containing silica gel (40 g.); the fraction eluted with a mixture of methanol and 1,2-dichloroethane (7:3 by volume) contains chromatographically pure N-L-leucyldaunorubicin.

The N-L-leucyldaunorubicin obtained by concentrating to dryness under reduced pressure is dissolved in water containing 1 equivalent of hydrochloric acid. The solution thus obtained is lyophilized to yield N-L-leucyldaunorubicin hydrochloride (0.3 g.).

N% : 4.15 (theory : 4.13).

Rf = 0.74 [silica gel; methanol-1,2-dichloroethane (1:1 by volume)].

EXAMPLE 2

Daunorubicin hydrochloride (1.39 g.) is dissolved in dimethylformamide (40 cc.). Triethylamine (0.344 cc.) and the N-trityl-D-leucinate of N-hydroxysuccinimide (1.25 g.) [prepared by condensing N-trityl-D-leucine with N-hydroxysuccinimide in the presence of dicyclohexylcarbodiimide in a mixture of ethyl acetate and dioxane] are added. The mixture is stirred for 24 hours at 20° C. and concentrated to dryness under reduced pressure (0.3 mm. Hg) at 50° C. The resulting residue is taken up in a mixture of 1,2-dichloroethane and methanol (95:5 by volume). The solution is filtered through silica gel (120 g.) contained in a column 2 cm. in diameter. The filtrate is evaporated to dryness under reduced pressure (20 mm. Hg) at 50° C. to yield N-trityl-D-leucyldaunorubicin (1.75 g.).

Rf = 0.90 [silica gel; methanol-1,2-dichloroethane (1:1 by volume)].

This product is taken up in 75 percent acetic acid (100 cc.) and the mixture is stirred for 1 hour at 20° C. The reaction medium is cooled to 0° C. and the pH is adjusted to 7 by addition of 15N aqueous ammonia. The insoluble material is filtered off and copiously washed with distilled water. The filtrate is lyophilized and N-D-leucyldaunorubicin (1.12 g.) is obtained in a yield of 71 percent of the theoretical yield.
N% = 4.7 (theory: 4.37).
Rf = 0.70 [silica gel; methanol-1,2-dichloroethane (1:1 by volume)].

EXAMPLE 3

By following the procedure of example 1 but starting with daunorubicin hydrochloride (2.2 g.), a buffer solution (500 cc.), D-leucine-N-carboxyanhydride (0.691 g.) and acetone (25 cc.), N-D-leucyldaunorubicin hydrochloride (200 mg.) is obtained.
Rf = 0.70 [silica gel; methanol-1,2-dichloroethane (1:1 by volume)].

EXAMPLE 4

Daunorubicin hydrochloride (100 mg.) is dissolved in dimethylformamide (3 cc.). Triethylamine (0.025 cc.) and the trityl-L-phenylalaninate of N-hydroxysuccinimide (95 mg.) [prepared by condensing trityl-L-phenylalanine with N-hydroxysuccinimide in the presence of dicylohexylcarbodiimide in dioxane] are added.

By following the procedure described in example 2, the following are successively obtained:
N-trityl-L-phenylalanyldaunorubicin (181 mg.),
Rf = 0.90 [silica gel; methanol-1,2-dichloroethane (1:1 by volume)], and N-L-phenylalanyldaunorubicin hydrochloride (77 mg.).
N% = 3.8 (theory = 3.93).
Rf = 0.83 [silica gel; methanol-1,2-dichloroethane (1:1 by volume)].

EXAMPLE 5

Daunorubicin hydrochloride (100 mg.) and diethylamine ditrityl-L-lysinate (129 mg.) are dissolved in dimethylformamide (4 cc.), and N-hydroxysuccinimide (27 mg.) is added. After cooling to 0° C., dicyclohexylcarbodiimide (38 mg.) is added and the mixture is stirred for 4 hours at 0° C. and then for 20 hours at 20° C. A slight amount of insoluble matter is filtered off. The filtrate is concentrated to dryness under reduced pressure (0.3 mm. Hg) at 50° C. The resulting residue is taken up in a mixture of 1,2-dichloroethane and methanol (95:5 by volume). The solution is filtered through silica gel (12 g.) contained in a column 12 mm. in diameter. The filtrate is concentrated to dryness under reduced pressure (20 mm. Hg) at 50° C. to yield N-ditrityl-L-lysyldaunorubicin (130 mg.).
Rf = 0.85 [silica gel; methanol-1,2-dichloroethane (1:1 by volume].

The resulting residue is taken up in 75 percent acetic acid (10 cc.), and the solution stirred for 1 hour at 20° C. The reaction medium is cooled to 0° C. and the pH is adjusted to 7 by addition of 15N aqueous ammonia. The insoluble matter is filtered off and copiously washed with distilled water, and then taken up in a mixture of distilled water (25 cc.) and 0.1N hydrochloric acid (2.5 ml.). Insoluble matter is filtered off, and the filtrate then lyophilized to yield N-(N-ϵ-trityl-L-lysyl)daunorubicin dihydrochloride (60 mg.).
N% = 3.9 (theory = 4.32).
Rf = 0.77 [silica gel; methanol-1,2-dichloroethane (1:1 by volume)].

EXAMPLE 6

By following the procedure of example 1 but starting with daunorubicin hydrochloride (2 g.), buffer solution (500 cc.), L-phenylglycine N-carboxyanhydride (0.690 g.) and dioxane (15 cc.), N-L-phenylglycyldaunorubicin hydrochloride (550 mg.) is obtained.
N% = 3.85 (theory = 4.01).
Rf = 0.84 [silica gel; methanol-1,2-dichloroethane (1:1 by volume)].

EXAMPLE 7

N-L-leucyldaunorubicin hydrochloride (0.53 g.) is dissolved in ethanol (60 cc.) containing 2.5 percent acetic acid. Thiosemicarbazide (0.072 g.) is added and the mixture then heated for 4 hours at 40° C. with stirring. Thereafter it is stirred for 13 hours at 20° C. and concentrated to dryness under reduced pressure (20 mm. Hg) at 45° C. The dry residue is taken up in distilled water (100 cc.), and the resulting solution lyophilized to yield 4methoxy-5,12-dioxo-6,9,11-trihydroxy-7-(2,3,6-o-tridesoxy-3-N-L-leucylamino-1-L-lyxohexosyl)-9-[1-(thiosemicarbazono)ethyl]-5,7,8,9,10,12-hexahydronaphthacene hydrochloride (0.555 g.).
N% = 9.3 (theory = 9.33).
Rf = 0.70 [silica gel; methanol-1,2-dichloroethane (1:1 by volume)].

The present invention includes within its scope pharmaceutical compositions which comprise at least one of the naphthacene derivatives of general formula I, or a nontoxic salt thereof, in association with a pharmaceutically acceptable carrier or coating. In clinical practice the compounds of the present invention will normally be administered orally, parenterally or rectally.

Solid compositions for oral administration include compressed tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavoring, perfuming and preserving agents. The compositions according to the invention, for oral administration, also include capsules of absorbable materials such as gelatin containing one or more of the active substances with or without addition of diluents or excipients.

Preparations according to the invention for parenteral administration include sterile aqueous or nonaqueous solutions, suspensions, or emulsions. Examples of nonaqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved or dispersed in sterile water or some other sterile injectable medium immediately before use.

Compositions for rectal administration are suppositories which contain, in addition to the active substance excipients such as cacao butter, a suitable wax base or solidified glycerin.

The percentage of active ingredient in the compositions of the invention may be varied, it being necessary that it should constitute a proportion such that a suitable dosage shall be obtained. The dosage will depend upon the therapeutic effect sought, the route of administration, the length of treatment, and the species of animal. In human therapy, for example in the treatment of lymophoblastic and myeloblastic forms of acute leukemia, and chronic myeloid leukemia, the compositions should generally be administered so as to give, in the case of parenteral administration, doses between 2 and 10 mg./kg. of naphthacene derivative per day for an adult.

The following example illustrates pharmaceutical compositions according to the invention.

EXAMPLE 8

A solution of the following composition is prepared:

| | |
|---|---|
| N-L-leucyldaunorubicin hydrochloride | 2.1 g. |
| distilled water | 100 cc. |

This solution is sterilized by filtering through a bacteriostatic filter and is then divided between ampoules in a quantity of 10 cc. per ampoule. The ampoules are thereafter lyophilized under a nitrogen atmosphere and sealed.

For parenteral administration as a medicine, an injectable solution is prepared immediately before use by adding 5 cc. of physiological serum to the contents of the ampoule. A 5 cc. solution containing 200 mg. of active product is thus obtained.

We claim:

1. A naphthacene compound of the formula:

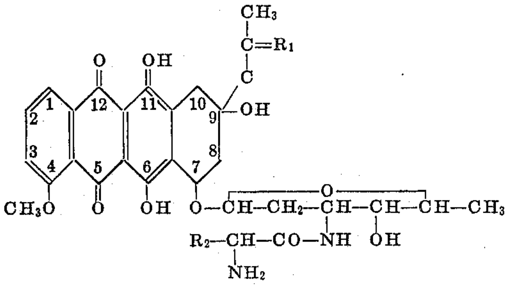

wherein $R_1$ represents an oxygen atom or a group of the formula:

$:N-NHCSNH_2$ $R_2$ represents hydrogen, alkyl of at most four carbon atoms, aminoalkyl of at most four carbon atoms unsubstituted or substituted on the amino group by trityl, phenyl, or phenylalkyl of at most four carbon atoms in the alkyl, and nontoxic salts thereof.

2. The naphthacene compound according to claim 1 which is 4-methoxy-5,12-dioxo-6,9,11-trihydroxy-7-(2,3,6-O-tridesoxy-3-N-L-leucylamino-1-L-lyxohexosyl)-9-acetyl-5,7,8,9,10,12-hexahydronaphthacene, and nontoxic acid addition salts thereof.

3. The naphthcene compound according to claim 1 which is 4-methoxy-5,12dioxo-6,9,11-trihydroxy-7-(2,3,6-O-tridesoxy-3-N-D-leucylamino-1-L-lyxohexosyl)-9-acetyl-5,7,8,9,10,12-hexahydronaphthacene and nontoxic acid addition salts thereof.

4. The naphthacene compound according to claim 1 which is 4-methoxy-5,12-dioxo-6,9,11,-trihydroxy-7-(2,3,6-O-tridesoxy-3-N-L-phenylalanylamino-1-L-lyxohexosyl)-9-acetyl-5,7,8,9,10,12,-hexahydronaphthacene and nontoxic acid addition salts thereof.

5. The naphthacene compound according to claim 1 which is 4-methoxy-5,12-dioxo-6,9,11-trihydroxy-7-(2,3,6-O-tridesoxy-3-N-ε-trityl-L-lysylamino-1-L-lyxohexosyl)-9-acetyl-5,7,8,9,10,12-hexahydronaphthacene and nontoxic acid addition salts thereof.

6. The naphthacene compound according to claim 1 which is 4-methoxy-5,12-dioxo-6,9,11-trihydroxy-7-(2,3,6-O-tridesoxy-3-N-L-phenylglycylamino-1-L-lyxohexosyl)-9-acetyl-5,7,8,9,10,12-hexahydronaphthacene and nontoxic acid addition salts thereof.

7. The naphthacene compound according to claim 1 which is 4-methoxy-5,12-dioxo-6,9,11-trihydroxy-7-(2,3,6-O-tridesoxy-3-N-L-leucylamino-1-L-lyxohexosyl)-9-[1-(thiosemicarbazono)ethyl]5,7,8,9,10,12-hexahydronaphthacene and nontoxic acid addition salts thereof.

* * * * *